Feb. 23, 1943.  F. D. CORNELL  2,311,640
MEANS FOR HOUSING ANIMALS
Filed Sept. 26, 1939  5 Sheets-Sheet 3
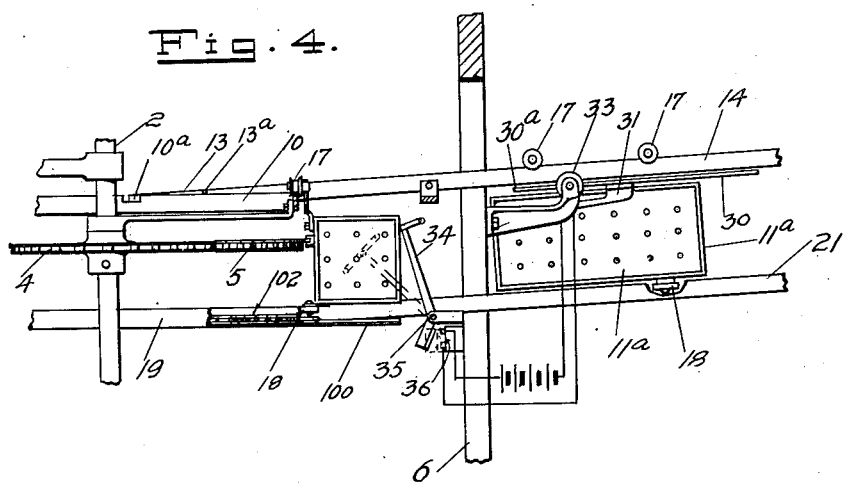
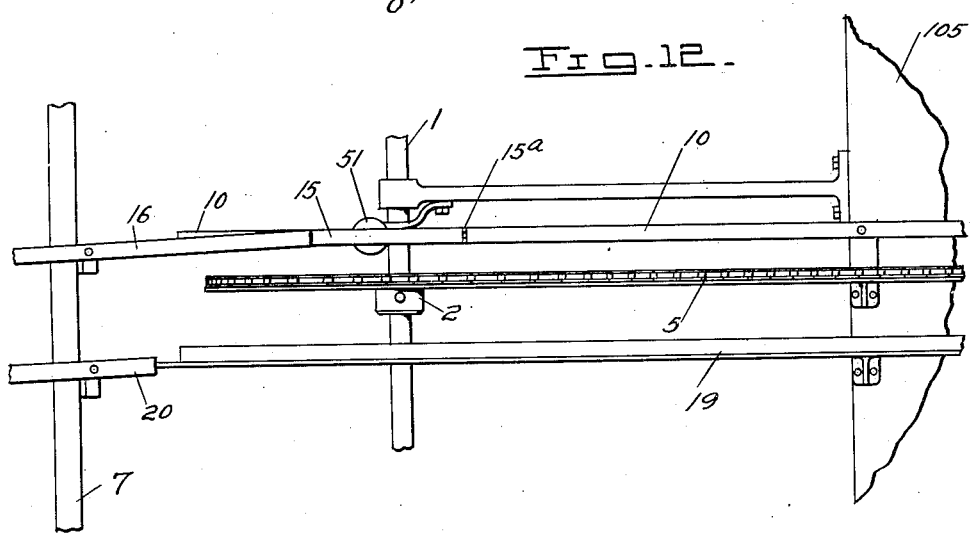
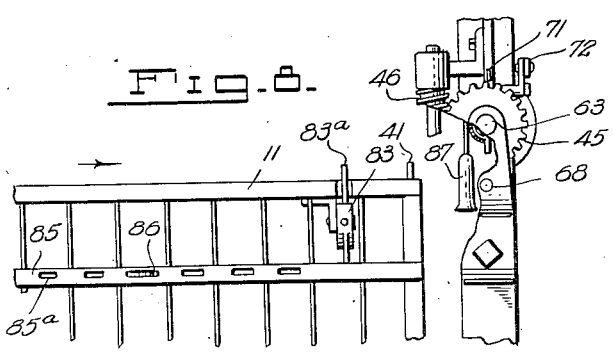
INVENTOR:
F. D. CORNELL
BY
ATTORNEY.

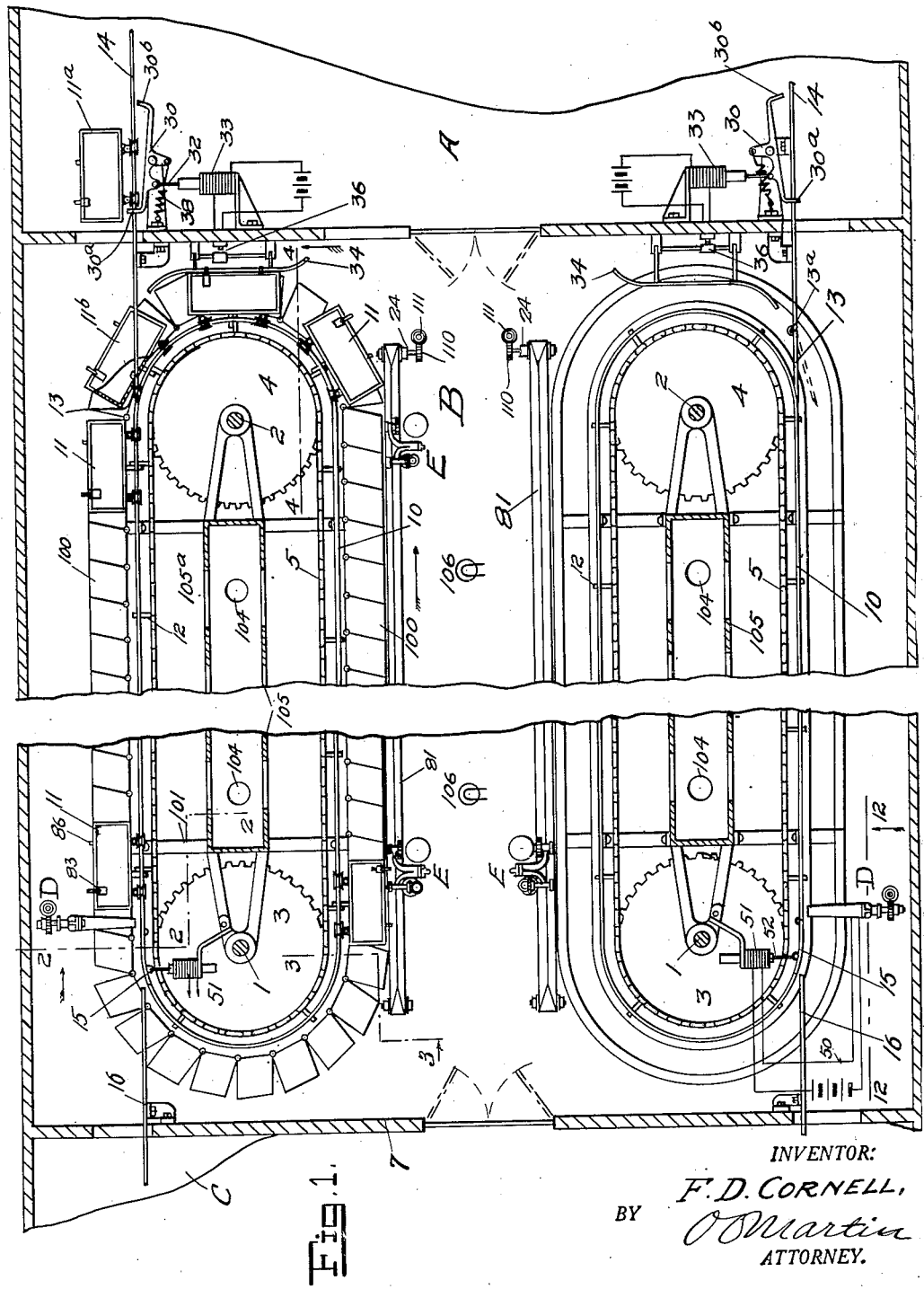

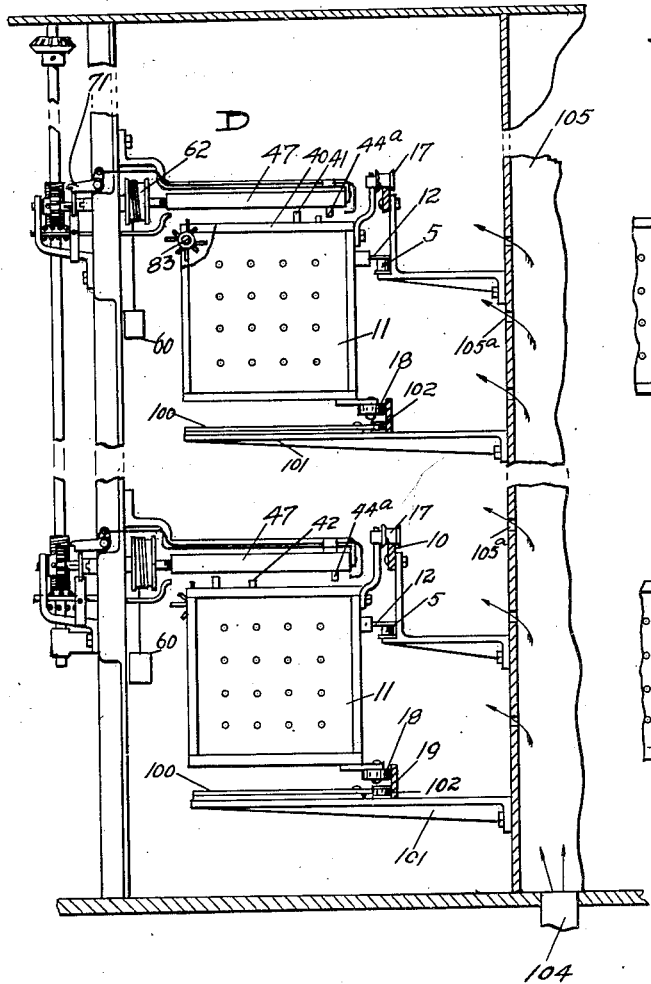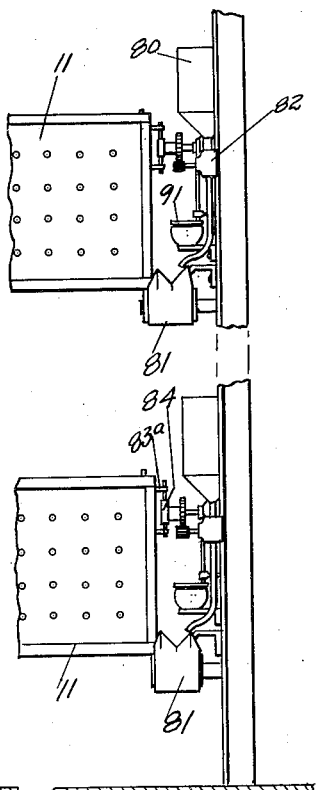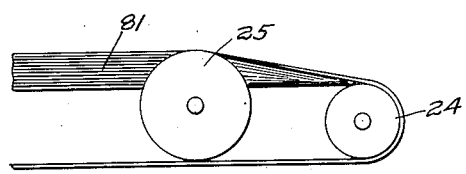

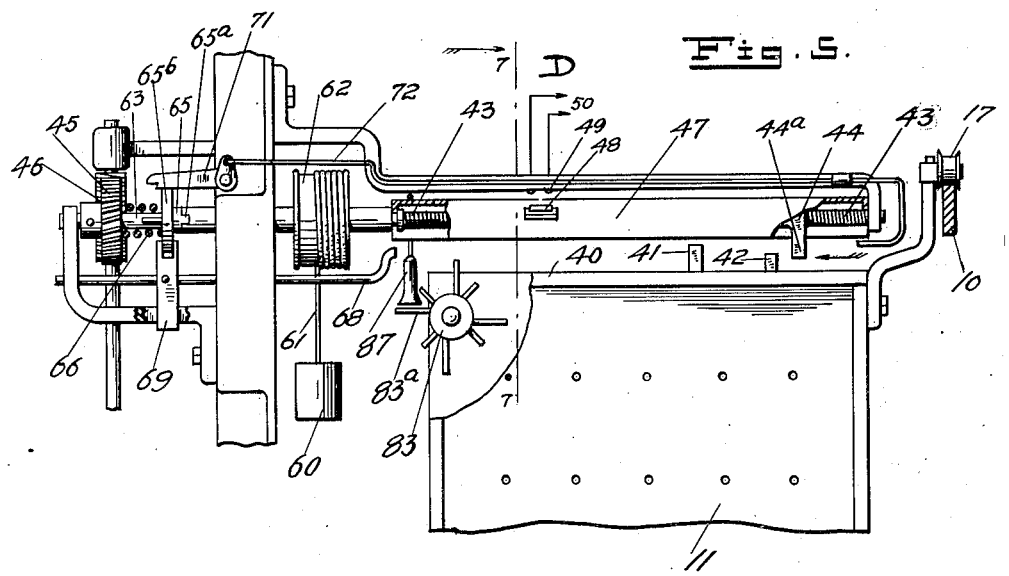
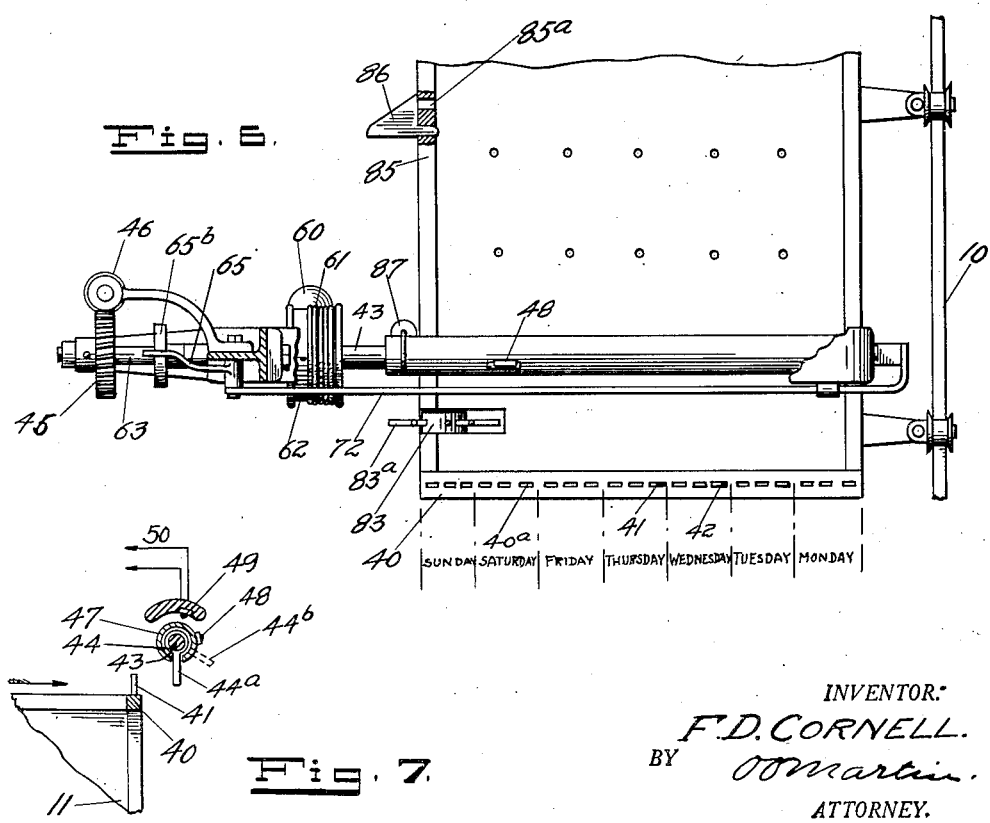

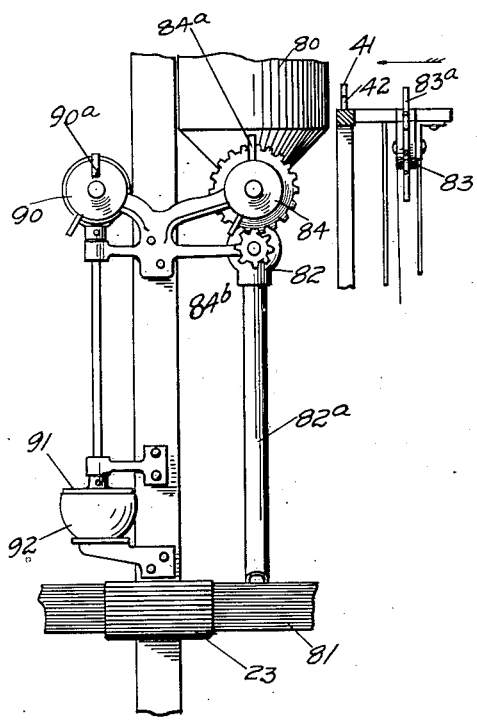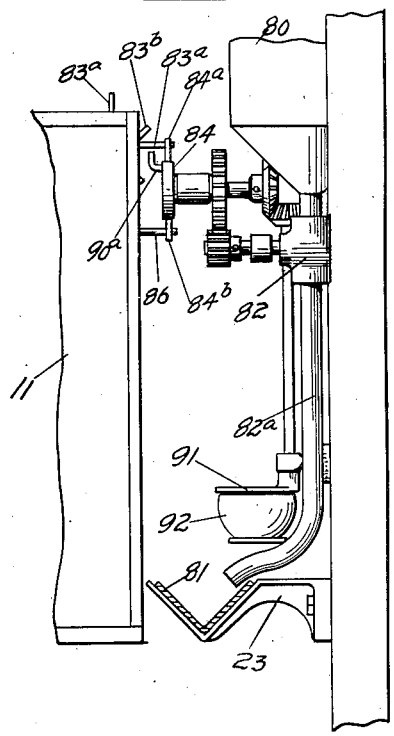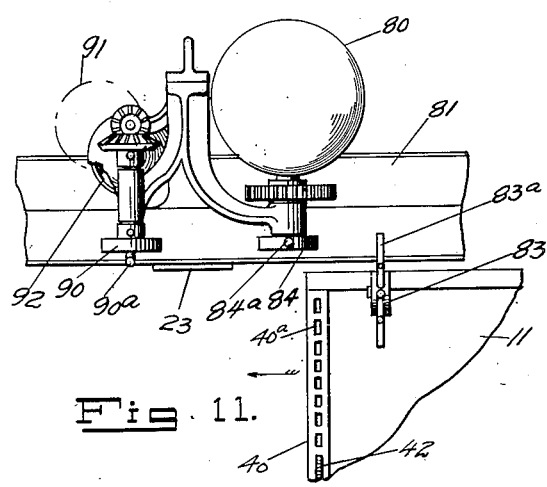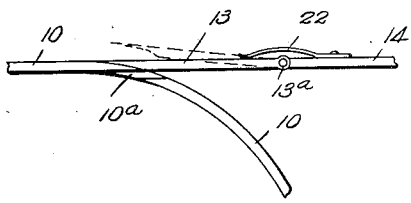

Patented Feb. 23, 1943

2,311,640

UNITED STATES PATENT OFFICE 2,311,640

MEANS FOR HOUSING ANIMALS

Fay D. Cornell, Pasadena, Calif.

Application September 26, 1939, Serial No. 296,593

27 Claims. (Cl. 119—21)

This invention relates to poultry equipment and particularly to improvements in equipment of this kind for use primarily in such establishments as the poultry feeding stations of packing houses.

Fowls in large quantities are daily received into such establishments from various sources and they are usually first graded according to breed, age and condition, whereupon the proper feeding period and the proper measure of feed for each grade of fowls is determined. The graded fowls are thereupon divided into groups which are placed in batteries of sixteen compartments, each of which is of a size to accommodate seven birds. The feeding period and the feed requirements are suitably marked on each battery, or at least indicated in such a manner that the attendants can properly service the fowls. The batteries, which are mounted on wheels, are then rolled into a feeding room and placed end to end to form long rows with work alleys between the rows.

The servicing of the fowls within the feeding room of such establishments is, so far as I have been able to determine, manually effected and must be executed with great care in order to bring each animal to the desired condition of weight and quality during the feeding period and at the same time to reduce mortality to a minimum.

The labor cost of routing the batteries back and forth, of feeding and watering the animals, and of attempting to maintain clean and sanitary conditions within the feeding rooms, is necessarily great. This is particularly true since no attempt usually is made to control the feeding scientifically, or to provide air conditioning apparatus. Also, it is important to consider that the practically continuous operation of trundling batteries in and out of the feeding room is noisy, disturbing, and keeps the birds in such a state of excitement that good results of the feeding effort may not be hoped for.

It is the general object of the present invention to mechanize and systematize the process of routing fowls through the feeding rooms of a packing plant or other poultry establishment. To this end, it is my aim to carry poultry into and through the feeding rooms in a continuous procession and at such slow speed that the fowls hardly will be conscious of such movement after they have entered the feeding room.

It is a further object to provide selective means for automatically passing each group of fowls into the feeding room, for keeping the birds there the required period of time, and for automatically routing them out of the room at the end of this period.

Another object is the provision of means automatically supplying feed and water to the fowls in certain predetermined relation to the feeding period of each group.

A further object is to provide improved means for receiving droppings from the fowls designed to maintain the birds in a sanitary condition at all times.

Still another object is to provide light control means, together with proper and efficient ventilating devices.

Other objects and the many advantages of the invention will be recognized upon perusal of the description to follow, and drawings are hereto annexed in which a preferred form of the invention is illustrated.

In the drawings:

Fig. 1 is a plan view illustrating a general outline of the invention;

Fig. 2 is a fragmentary end elevation of a portion of the device and is taken substantially on a line 2—2 of Fig. 1, in the direction of the arrow;

Fig. 3 is a fragmentary end elevation of another portion of the device, as viewed from line 3—3 of Fig. 1;

Fig. 4 is another fragmentary end elevation of a different portion of the device and is taken substantially on line 4—4 of Fig. 1;

Fig. 5 is a view, on a larger scale, of a portion of Fig. 2;

Fig. 6 is a plan view of the mechanism shown in Fig. 5;

Fig. 7 is a sectional end elevation of a part of Fig. 5, substantially as viewed from a line 7—7 in the direction of the arrow;

Fig. 8 is an end elevation of the devices of Fig. 5 as viewed from the left side thereof;

Fig. 9 is a view, on a larger scale, of a part of the devices of Fig. 3;

Figs. 10 and 11 are, respectively, an end elevation and a plan view of the devices of Fig. 9;

Fig. 12 illustrates a portion of the machine framing, substantially as viewed from line 12—12 of Fig. 1;

Fig. 13 is a detail view, on a larger scale, of the feed belt of the device;

Fig. 14 is a detail view on a larger scale of one of the track switch connections of the device.

In a copending application, Ser. No. 34,680, which has become Patent No. 2,257,734, issued October 7, 1941, is disclosed and described a husbandry system, in accordance with which animals, such as poultry, are held confined within a light and air controlled building in cages slowly circulating through lighted and darkened zones during their productive period or until ready for the market. The present invention follows to a large extent the principles laid down in this prior application and reference thereto is invited to facilitate perusal of the present description.

In the diagrammatic Fig. 1, a portion of a building is shown divided into a receiving chamber A, a feeding room B, and a disposing room C. Two sets of carriers are shown mounted within the room B and, as these carriers may be exactly alike, except that they are arranged to move in opposite directions, and also in order to facilitate perusal of the description, the lower carrier has been stripped of all but the framework necessary to carry the confined birds. But it should be understood that, in practice, all carriers should be complete with every part necessary to carry the invention into effect. The upper carrier is shown as fully equipped as may conveniently be shown within the limited space afforded in the figure, but each important carrier feature is more fully illustrated in other figures.

Each carrier is operated from vertically mounted shafts 1, 2, fitted with sprocket wheels 3, 4, over which chains 5 are bent. These shafts are suitably connected to rotate at very slow speed in any suitable manner, but it is not thought necessary to burden the present case with a description of such common driving mechanism. A track 10 is arranged in parallel relation to this chain to support containers 11, and the chain is made with projections 12 adapted to engage these containers and to push them along the track. These devices, which for convenience may be termed the conveying means of the invention, will be more fully described presently.

A straight track portion 14 is shown extending from the main track into the receiving room A, and this track portion is fitted with a normally closed switch member 13. It will be explained in detail how the container 11ᵃ may be held in readiness on this straight track to slide on to the track 10, and also the manner in which one of the projections 12 picks up the container and carries it around the track a predetermined number of times.

The feeding period in establishments such as here considered ordinarily varies from one day to two weeks or possibly even longer. But for the sake of simplicity and in order more clearly to explain the method of operation of the present invention, a feeding period of from one to seven days will be assumed. It will furthermore, for the sake of the following discussion, be assumed that each container makes one complete circuit in eight hours. In view of this, it is seen that a container will have to travel around the track six times in order to cover a two day feeding period. Preferred means of attaining this result is illustrated in the drawings and will now be described in detail.

Attention is here directed to a second switch 15, which is cut into the other end of each track 10 to connect with a straight track 16, and mechanism will be descibed adapted automatically to throw this second switch when a container reaches the end of its feeding period, thereby to direct this container on to said straight track.

As in said copending application, a number of containers may be supported above each other in horizontal tiers, but for the sake of simplicity and because additional tiers merely would show duplications, only two tiers are shown in Figs. 2 and 3. A track 10 is, in this form of the invention, provided for each tier and each container is fitted with wheels 17 riding on this track. A second pair of wheels 18 are shown hung at the bottom of each container to ride on a track 19 for the purpose of guiding the containers while they circulate around the track, and to ride on tracks 20, 21 before the containers enter and after they leave this track. The last named tracks are best shown in Fig. 12.

As indicated in Figs. 4 and 12, the straight track portions 14, 16, 20 and 21 are downwardly inclined in the direction of movement. It is also to be noted that the container 11ᵃ, of Figs. 1 and 4, is shown held against gravitational movement on the track 14 by a stop 30ᵃ of a lever 30, and this lever is shown pivotally mounted on a bracket 31 of the partition 6 which separates the space A from the feeding room B. A link 32 connects this lever with a magnet 33. A light frame 34 is pivotally hung on the opposite side of this partition, at 35, and this frame is held pushed back into the position indicated by the succession of containers as they pass around the end curve of the track, but it is to be noted that it will tilt forward, by gravity or otherwise, when a break occurs in the succession of moving containers, as indicated in the lower portion of Fig. 1 and in dotted outline in Fig. 4, and that this tilting movement is utilized to close a switch 36, thereby to energize a circuit through the magnet 33 and to cause the latter to withdraw the stop 30ᵃ, against the tension of a spring 38, for the purpose of releasing the container.

The released container 11ᵃ is now by gravity impelled to roll slowly down the track 14 until checked by a container which at that time is carried past the switch 13, and it follows behind this container until it reaches the level, main track 10, where it remains stationary until the next following projection 12 comes along and picks it up. The switch member 13 is shown pivotally hung on the track 14 at 13ᵃ and it is shown yieldingly held closed by a suitable spring 22. It is also to be noted that the track 10 at this point is shown made with a depression, or slot 10ᵃ, provided for the purpose of clearing the flange of the container wheels 17, when the latter pass over the switch member on to the main track.

From the foregoing, it is seen that the attendant is required to place fowls in containers, properly grouped relative to the desired period of feeding and to hand these containers on the track 14. Also that, when a break in the succession of containers on the main track occurs, the waiting container automatically will be transferred thereto and be circulated thereon until the end of the prescribed feeding period, whereupon it will automatically be transferred to the delivery track 16 in the manner which will now be described. A number of containers may be held in readiness on track 14, and their movement is controlled by a second stop 30ᵇ, at the opposite end of the lever 30, which projects into the path of movement of the next following container the moment the container 11ᵃ is released.

As best indicated in Fig. 6, each container is fitted with a bar 40 at the upper forward end, and this bar is shown made with a series of sockets 40ᵃ shaped to receive a stop member 41. Above the path of travel of the containers and near each switch 15 is transversely fixed a control member D, see also Figs. 5 to 7, comprising a screw 43 upon the threads of which a member 44 is seated to slide axially in response to rotations of the screw. The latter is operatively connected with a wormwheel 45 which, through a worm 46, is connected to advance the member 44 in timed relation to the movement of the containers until it reaches a position in the line of travel of the stop 41. The member 44 is made with a lug 44ª which extends downward through an axial slot of a surrounding sleeve 47 into the path of travel of the stop 41 to cause the latter to swing the member 44 into the position indicated in dotted outline at 44ᵇ, of Fig. 7, in order to permit the stop to pass. The sleeve 47 is forced to rotate on the screw 43 in response to this movement until a contact member 48, of the sleeve, reaches contacts 49 of a circuit 50. This circuit extends to a magnet 51, see Fig. 1, which through the medium of a link 52 is connected to throw the track switch 15. The container is then free to be pushed along the latter and on to the downwardly inclined disposal track 16.

It was stated that the feeding period variation for the purpose of this description is assumed to be from one to seven days, and that each circuit on the track is completed in eight hours or, in other words, that three circuits are completed each day. If the bar 40 is divided into seven equal sections and the sections are marked "Monday" to "Sunday," as indicated in Fig. 6, and if three equidistant sockets 40ª are placed within each section, it is merely required to place the stop 41 in the proper socket of the desired delivery day, at the time the containers are hung on the receiving track, to cause the containers to be discharged from the feeding room at the end of the desired period provided, of course, that the screw 43 is rotated at the proper speed to cause the lug 44ª to travel a distance equal to the distance between the sockets 40ª in eight hours.

The following example should suffice to explain the foregoing statement. Let it be assumed that it is now Monday morning and that a container of fowls requiring a feeding period of two days is held in readiness on track 14. The lug 44ª is at this time at the right end of the screw and is commencing to advance in the direction of the arrow of Fig. 5. The stop 41 is placed in the socket corresponding to Wednesday morning. The waiting container enters the first vacant space on the main track and completes six circuits thereon, at which time the stop 41 reaches the lug 44ª which has traveled along the screw to a position in the path of travel of the stop. The latter contacts and swings the lug on the screw to tilt the sleeve 47 and thereby to close the magnet circuit 50. The container is then automatically transferred to the disposal track, as above described.

When the lug reaches a point in line with the last socket 40ᵇ of the timing bar 40, it becomes necessary to return it to its initial position. This may be done in various ways, and it is here conveniently shown effected through the medium of a weight 60, which is shown held suspended from a cable 61 of a drum 62 rigid on the screw 43. The latter is mounted to rotate on a stub shaft 63 which, through the medium of the gear 45 is connected for rotation by the circulating mechanism at the proper speed, as above stated. A sleeve 65 is mounted on this stub shaft to slide axially on a feather of the shaft, and it is made with a tongue 65ª engaging a groove in the end of the screw 43. A spring 66 maintains these parts yieldingly interengaged. When the lug 44ª approaches the end of its travel, it is noticed that it reaches the end of a slidable rod 68 to advance this rod until an arm 69 of the rod draws the sleeve 65 away from the end of the screw. A shoulder 65ᵇ of the sleeve becomes engaged by a pawl 71 which by gravity drops behind this shoulder to hold the rod in this advanced position. The weight is now free to drop and in dropping to rotate the screw rapidly in the opposite direction and thereby to return the lug 44ª to its initial position. It is noticed that a rod 72 extends from the pawl 71 to the other end of the screw and that the end of this rod is bent downward to reach a position in the line of travel of the returning lug which at the time it reaches the end of its travel, pushes the rod 72 along sufficiently to swing the pawl 71 clear of the shoulder 65ᵇ. The spring 66 is then free to reengage the sleeve 65 with the screw to reconnect the latter with the container drive mechanism and to commence a new cycle of operation.

In view of the foregoing, it is seen that the lug is timed to complete its forward trip along the screw 43 in seven days. Let it be assumed that it is Thursday and that a container is required to circulate in the feeding room until the following Tuesday. It is then merely required to plug the stop 41 into the proper socket to bring it into engagement with the lug at the time specified. But the screw may, of course, be geared to complete its advance movement in two weeks, if preferred, in which case twice the number of sockets would be required to correspond with eight hour container cycles.

It is considered good practice to serve no feed to the fowls for twelve or even twenty four hours before they pass to the disposal compartment and to supply only water during this final period. This may be accomplished in the manner which will now be described, and a method of intermittently supplying prescribed feed to the various compartments will be included in this description. At this time, it is well to mention that the circuit through which the containers travel is divided into a lighted and a darkened zone, substantially as fully described in said copending application, and that all feeding and watering is done while the containers travel through the lighted zone.

The feed dispensing mechanism, which for convenience may be termed a feeding or a supply station is, in Fig. 1, indicated at E, and it is in Figs. 9 to 11 shown to comprise a feed hopper 80, suitably placed above the moving containers to deposit a measured quantity of feed on to a belt 81 which travels along with the containers as they pass through the lighted zone, and the passage from this hopper is controlled by a suitable valve 82. Within each container, near its top, is rotatably hung a selective control member 83, comprising a series of outwardly extending arms, one of which at 83ª is shown horizontally projecting beyond the front of the container. The valve 82 is by suitable spur gears shown connected to a disc 84, having an arm 84ª vertically rising into the path of travel of the arm 83ª. It is, in Fig. 1 noticed that the feeding station is placed near the entrance to the lighted zone in order that, when a container enters this zone, the arm 83ª may swing the arm 84ª to open the valve and to cause a quantity of preferably semi liquid feed to flow through the feed conduit 82ª and into the feed trough. The latter is made in the form of an endless belt which travels along with the containers in order to afford the fowls time to pick up the feed deposited therein. The upper reach of this belt is supported on brackets 23 of the machine frame to form a V-shaped trough, and it is at the ends bent over rollers 24, as best indicated in Fig. 13. Or grooved rollers 25 may be substituted for the brackets 23, as also therein indicated, if preferred. A worm gear 110 is, in Fig. 1, shown secured to the shaft of the roller 24, and it is in permanent mesh with a worm 111. The latter is, in any suitable manner (not shown) connected to the main drive mechanism to move the belt 81 at the same speed as the containers 11.

A horizontal bar 85 is placed in the front of each container, see Fig. 8, and this bar is made with a series of sockets 85ª, shaped to receive a detachable stop 86 which, as the container travels along, reaches and swings a pendent arm 84ᵇ to return the disc 84 to its initial position, thereby again to close the valve 82. The attendant who grades the fowls in the first place may also be instructed to determine the quantity of feed which each group of fowls is to receive in passing the feed dispensing mechanism. To this end he is required to place the stop 86 in a socket the proper distance from the arm 84ᵇ to allow time for the desired quantity of feed to pass the valve 82 before the latter again is closed.

I wish to point out that a series of feeding stations E preferably should be placed along the lighted zone and that merely sufficient feed should be supplied at any one time to satisfy the cravings of the fowls. The distance these stations are spaced apart should be calculated to permit sufficient time to elapse after each feeding period to whet the appetite of the fowls before the next feeding station is reached. Preferably no water should be given during the feeding periods, but the feed should contain enough moisture to compel the fowls to consume a large quantity of feed in order to satisfy their craving for water.

It was stated that the feeding should be discontinued and water only provided several hours before the containers pass out of the feed room, and in order to effect this operation at the proper time, it is merely required to place a second stop 42 the required number of sockets ahead of the stop 41, see Fig. 5. This second stop should, however, be somewhat shorter than the stop 41 in order that the rotation of the sleeve 47, caused by the movement of the stop 42 against and under the lug 44ª, may not be sufficient to close the circuit through the switch 48, 49. The rotation of the sleeve does, however, cause a weight 87, which is held suspended from the sleeve, to descend by gravity and to depress the arm 83ª, causing the member 83 to rotate until a shorter arm 83ᵇ reaches horizontal position.

Referring now to Fig. 11, it is seen that a second disc 90 is placed a short distance from the disc 84, in line therewith. An arm 90ª projects sidewise and upward from the face of this disc into the path of travel of the shorter arm 83ᵇ, to be swung by the latter as the container advances. The disc 90 is shown operatively connected to swing a cover 91, of a drinking cup 92, to one side, substantially as indicated in dotted outline in Fig. 11, thereby to uncover this cup, which herein for convenience may be called a watering station, from which the fowls then may take water in passing. It is, however, necessary again to close this cover before the container completely passes the drinking cup because it may not be desired to allow the fowls of the next following container to take water. This closing movement is also effected by the stop 86 which, in passing, strikes a downwardly directed arm of the disc 90 (see Fig. 10) to return the cover to its original, closed position. It was above stated that the stop 86 is placed in one of the series of sockets 85ª, and it is now seen that the placing of the stop serves to control the period of time allowed the fowls for drinking. It is also important to note that the position of this stop, or any other suitable stop that may be substituted therefor, controls the period of time during which the valve 82 is allowed to remain open and so determines the measure of semiliquid feed which it is desired to deliver through the valve.

It is considered preferable to have the birds first reach the feeding stations, so that they may take all the feed they can consume before reaching the water. But the mechanism may be reversed, if desired, first to give the birds access to the water, and the stations are, in order to illustrate this arrangement, in Figs. 9 to 11 shown placed in reverse relation to each other.

In the copending application above referred to, the system is provided with dropping belts carried along by the moving cages and beyond the carriers to scrubbing and rinsing devices. Such belts may also be applied to the present device, or trains of dropping plates 100 may be provided, if preferred. As such plate trains are illustrated and described in a copending application, Ser. No. 241,385, they are merely in the drawings shown resting on shelves 101 and may be suitably connected for movement by chains 102, which should be driven from the main circulating mechanism at the proper speed.

As in the two applications above referred to, the building within which the device of the invention is installed should be air conditioned, and similar devices should in this case be provided. It is, for this reason, thought sufficient to indicate a hollow partition 105 within each container circuit, and to show that the walls of these partitions are made with apertures 105ª, through which conditioned air is carried to the containers from conduits 104 of an air conditioning system. The partition should, of course, reach from floor to ceiling in the feeding room B, in order to direct all the air from the conduits 104 through the apertures 105ª, and also in order effectively to darken the space behind the partitions. The lighting system may also remain substantially as disclosed in these applications and it is, for this reason, merely conventionally indicated at 106, in Fig. 1.

From the foregoing description of the invention in the preferred form illustrated it should now be clear to those versed in the art that the importance of the invention mainly resides in the almost unlimited flexibility of the system disclosed. In establishments such as herein considered a small number of fowls may be received at one time, while several thousands may arrive at some other time. It can readily be seen that, in the conventional systems, such as have come to my notice, when large shipments arrive at the same time, the confusion is so great that the work of grading and feeding the fowls cannot be handled scientifically. Also that a relatively large force of attendants must always be available to route the batteries through the different departments, and that the fowls are kept in a continuous state of excitement.

In the system of my invention, such confusion is not present because manual routing is eliminated and the containers pass slowly and in an orderly manner to the feeding room, preferably directly into the darkened zone, from which the fowls, quieted and rested, advance into the daylight zone to find the prescribed feed waiting for them. The work of the grader and his assistants, if any, is for this reason reduced to the grading operation and placing of the containers on the receiving tracks, making it possible to dispense with the large force of men required manually to wheel the batteries through the departments of the conventional type of plant.

In the feeding room of the conventional packing house, it is commercially impossible properly to balance the feed rations and to time the feeding according to predetermined schedules. In the present system, on the other hand, the needs of every fowl or group of fowls, so far as human judgment can dictate, may be automatically met, and where selective feeding apparatus and air conditioning devices, such as described in said copending applications, are incorporated, a commercially perfect system is obtained, requiring a minimum of manual labor.

The drawings being merely illustrative of one form of the invention, various modifications may be effected within the scope of the appended claims and as taught by the said copending applications.

I claim:

1. In a device for supporting animals, animal containers, feeding stations, means recurrently carrying the containers past said stations, feed receptacles, means controlled by the containers for delivering feed to said receptacles as the containers pass said stations, a receiving station, and means for automatically passing containers from said receiving station to said carrying means.

2. In a device for supporting animals, animal containers, feeding stations, feed receptacles at said stations, watering stations, means recurrently carrying said containers past said feed and watering stations, means on the containers controlling delivery of feed from and access to water at said stations for consumption by the animals in the containers, means passing containers to said carrying means, and means discharging containers from said carrying means a predetermined period of time after the entrance of the containers to the carrying means.

3. In a device for supporting animals, conveying means, feeding stations adjacent to said means, animal containers mountable on said conveying means for movement past said stations, feed receptacles, means controlled by the containers for delivering feed from said stations to said receptacles, a receiving station, and means for automatically passing containers from said receiving station to the said conveying means.

4. In a device for supporting animals, endless conveying means, feeding stations adjacent to said means, animal containers mountable on said means for movement past said feeding stations, feed receptacles, means controlled by the containers for delivering feed from said stations to said receptacles, a receiving station, and control means operated by the moving containers to retain containers on said receiving station in position to enter said endless conveying means, said control means being adapted to change its position when a breach occurs in the succession of containers on said conveying means thereby to release a container on said receiving station for passage to the conveying means.

5. In a device for supporting animals, endless conveying means, animal containers on said means and movable thereby, a receiving station, means operated by the moving containers to retain containers at said receiving station in position to enter said endless conveying means and adapted to change its position upon the occurrence of a breach in the succession of containers on the conveying means thereby to release a container at the receiving station for passage to said conveying means, a discharge station for the containers, and means on the containers for controlling the period of time during which the containers are circulated on and by said conveying means and the discharge of each container at the end of its predetermined period of circulation.

6. In a device for supporting animals, animal containers, endless conveying means for supporting and circulating said containers, a receiving station for containers, means for retaining containers at said station in position to enter said conveying means, and means in the path of travel of the containers on said conveying means and maintained in position by said passing containers for controlling the operation of said container retaining means.

7. A device for supporting animals comprising, a receiving station, a feeding compartment, containers for animals, feeding stations within said compartment, receptacles for receiving feed from said stations, means for automatically passing containers to said feeding compartment, means for recurrently carrying said containers past said feeding stations, means on the moving containers controlling discharge of feed from said stations for consumption by the animals in the containers, and means for automatically discharging the containers from said feeding compartment upon termination of a predetermined number of passages past said feeding stations.

8. An endless track having an entrance and a discharge switch, a receiving track leading to said entrance switch, a track leading from said discharge switch, containers for animals mountable on the tracks, means on said endless track for circulating the containers mounted thereon, means holding containers in readiness on said receiving track and means controlled by the circulating containers for releasing the retained containers for passage to said endless track.

9. In a device for supporting animals, endless conveying means, animal containers on said means for continuous circulating movement thereby, a discharge switch in said conveying means, control means on said containers, and means operatively connected with said switch and actuated by said control means to discharge the containers over said switch at the expiration of a predetermined time period.

10. In combination, conveying means, animal containers on said means, adjustable control means on said containers, means passing containers to said conveying means, a discharge track, a switch between said track and the said conveying means, and devices actuated by said control means to determine the period of time the containers are held on said conveying means and to throw said switch such predetermined period of time after the containers enter the conveying means to direct the containers on to said discharge track.

11. In a device for supporting animals, supporting means, animal containers on said means, feed dispensing means, means for moving said containers on said supporting means past said feed dispensing means, feed receiving means moving with the containers, and adjustable control means on the containers for actuating said dispensing means to deposit a predetermined amount of feed on said feed receiving means.

12. In a device for supporting animals, a support, animal containers on said support, water receptacles, means moving said containers on said support past said water receptacles, means covering the receptacles, and adjustable control means on the containers for actuating said covering means to uncover the said receptacles.

13. In a device for supporting animals, feeding stations, containers for animals, means carrying said containers recurrently past said stations, feed receiving means moving along with the containers, and adjustable control means on each container for delivering the quantity of feed to which the said control means is adjusted from the stations to the said feed receiving means.

14. In a device for supporting animals, containers for animals, feeding stations, normally closed water receptacles out of which the supported animals may take water, means recurrently carrying said containers past said feeding stations and water receptacles, feed receiving means movable with the containers, manually adjustable means on the containers controlling delivery of feed from said stations to the said feed receiving means, and means on the containers for opening said water receptacles as the containers commence to pass the latter so that the animals may take water therefrom.

15. In a device for housing animals, normally closed water receptacles, containers for animals, means carrying said containers recurrently past said water receptacles, and means on the containers for opening the receptacles as the containers commence to move past the latter so that the animals within the passing containers may take water therefrom and for again closing the receptacles before the containers have completely passed the receptacles.

16. In a device for maintaining animals confined predetermined periods of time, a track, an endless chain, means for continuously moving said chain, animal containers on said track propelled by said chain, a discharge switch for the containers, means for operating said switch including a member moving across the path of travel of the containers at a predetermined rate of speed, and means mountable on each container in position to contact said member at the end of a predetermined period of time to actuate said switch operating means.

17. In a device for housing animals, a track, a chain, animal containers mountable on said track propelled by said chain, water pots, means moving said chain to carry said containers recurrently past said water pots, a cover for each pot, cover opening means, and means on each container for actuating said opening means.

18. In a plant for housing animals divided into a receiving chamber, an air and light controlled feeding room and a discharge chamber, parallel oblong endless tracks in said feeding room arranged to provide a lighted work alley therebetween, partitions from floor to ceiling occupying substantially the full length of the space within said tracks to block light from the work alley to the outer reaches of the tracks, tracks from said receiving chamber to said endless tracks, switches therebetween, tracks from the endless tracks to said discharge chamber, switches therebetween, containers mountable on said receiving tracks for passage to said endless tracks, means controlled by containers on the endless tracks for throwing said first named switches to admit containers to the endless tracks, operating means for said discharge switches, and means on each container actuating said operating means to pass containers to said discharge tracks.

19. In combination with a receiving chamber, a discharge chamber and an intermediate air and light controlled feeding room, parallel oblong endless tracks in said room arranged to provide a lighted work alley therebetween, partitions from floor to ceiling occupying substantially the full length of the space within said tracks to block passage of light from the work alley to the spaces on the darkened side of said partitions, tracks from said receiving chamber to the endless tracks, switches therebetween, tracks from the endless tracks to said discharge chamber, switches therebetween, containers mountable on said receiving tracks for passage to the endless tracks, means circulating the containers around the latter, means controlled by the containers to operate said switches, feed supply mechanisms within said work alley, feed conveyors movable with the containers along the work alley, and means on said containers for operating said mechanisms to deliver feed to said feed conveyors.

20. In combination with a receiving chamber, a discharge chamber and an intermediate air and light controlled feeding room, parallel oblong endless tracks in said room arranged to provide a lighted work alley therebetween, partitions from floor to ceiling occupying substantially the full length of the space within said tracks to block passage of light from the work alley to the spaces behind the partitions, tracks from said receiving chamber to the endless tracks, switches therebetween, tracks from the endless tracks to said discharge chamber, switches therebetween, containers mountable on said receiving tracks for passage to the endless tracks, means actuated by containers on the endless tracks for throwing said receiving switches to admit containers to said tracks, operating means for said discharge switches, means on each container actuating said operating means to pass containers to the discharge tracks at the end of predetermined periods of time, and feed and water troughs within said work alley.

21. In a device for housing animals, normally closed drinking receptacles, animal containers, means recurrently carrying said containers past said receptacles, means on each container for uncovering the receptacles upon reaching the latter, and means on each container for closing each receptacle a variable period of time before the container completely passes the receptacle.

22. In combination with a receiving chamber, a discharge chamber and an intermediate air and light controlled feeding room, parallel oblong endless tracks in said room arranged to provide a lighted work alley therebetween, partitions from floor to ceiling occupying substantially the full length of the space within said tracks to block passage of light from the work alley to the spaces behind said partitions, tracks from said receiving chamber leading to said endless tracks on the dark side of said partitions, switches therebetween, tracks from the dark sides of said partitions leading from the endless tracks to said discharge chamber, switches therebetween, containers mountable on said receiving tracks for passage to the dark side of the endless tracks, means actuated by containers on the endless track for throwing said receiving switches to admit containers to said tracks, operating means for said discharge switches, means on each container actuating said operating means to pass containers from the dark side of the tracks to the discharge tracks at the end of predetermined periods of time, and feed and water supply troughs within said work alley.

23. In an air and light controlled space, an oblong endless track, means dividing the space thereby occupied in a manner to provide a lighted zone on one side of the track and a darkened zone on the other side thereof, a receiving track leading to said endless track within the darkened zone, a switch mechanism operatively connecting the two tracks, a discharge track leading from the endless track within the darkened zone, a switch mechanism operatively connecting said last named tracks, containers mountable on said receiving track for passage to the endless track, said containers including means controlling operation of said receiving switch mechanism, and means on each container controlling operation of said discharge switch mechanism to pass the containers to the discharge track after a predetermined period of time.

24. In combination, containers for housing animals, endless conveying means shaped to support and to circulate said containers, control means on each container adjustable to determine the period of circulation of said container, means automatically discharging each container from said conveying means at the time set by said control means, a receiving station, and means automatically passing containers from said station to said conveying means each time an unoccupied place on the latter passes said station.

25. In a device for housing animals, endless tracks, endless chains, animal containers hung on said tracks in tiers, means moving said chains to propel said containers along said tracks, stationary feed stations adjacent each tier of containers, a feed receptacle at the containers of each tier, and means on the containers of each tier controlling delivery of feed from the stations of the same tier to the receptacle of the same tier.

26. In a device for housing animals, tracks, chains, containers mountable on said tracks in superimposed tiers, means moving said chains to propel said containers along the said tracks, stationary water receptacles adjacent each tier of containers, normally closed covers on said receptacles, operating mechanism for said covers, and means on the containers of each tier for actuating the operating mechanism of the same tier as the containers move past the receptacles.

27. In a device for housing animals, a track, a chain, animal containers mountable on said track, means for moving the said chain to propel the containers along the track, stationary dispensing mechanisms adjacent the containers, means on each container for actuating said mechanism to dispense supplies for consumption by the animals in the containers, receptacles for the dispensed supplies, and means on each container for actuating the mechanism to discontinue dispensing supplies, the last named means being mountable on the containers for adjustment thereon to vary the length of the dispensing period.

FAY D. CORNELL.